United States Patent [19]
Martinez et al.

[11] 3,863,176
[45] Jan. 28, 1975

[54] PORTABLE CHEMICAL LASER

[75] Inventors: John S. Martinez, Hermosa Beach; John R. Ogren, Hawthorne; Eugene V. Rutkowski, Palos Verdes Estates, all of Calif.

[73] Assignee: TRW Inc., Redondo Beach, Calif.

[22] Filed: Aug. 13, 1973

[21] Appl. No.: 387,866

[52] U.S. Cl.......... 331/94.5 P, 331/94.5 D, 330/4.3
[51] Int. Cl.............................. H01s 3/22, H01s 3/09
[58] Field of Search...................... 331/94.5; 330/4.3

[56] References Cited
UNITED STATES PATENTS
3,720,885  3/1973  Koloc................................. 331/94.5

*Primary Examiner*—Robert J. Webster
*Attorney, Agent, or Firm*—Daniel T. Anderson; Willie Krawitz; Alan D. Akers

[57] ABSTRACT

A portable self-contained chemical laser is provided. Fuel components for the laser are stored in relatively small cartridges which, when perforated, provide the laser with sufficient feed reactants to produce a short effective lasing output. Hot effluent gases from the laser cavity are collected in a chemical pump capsule and neutralized; excess heat of the effluent gases is also accumulated by the chemical pump cartridge. After firing, the fuel and chemical pump cartridges are both ejected from the system to remove both effluent gases and excess heat from the laser and the pump.

11 Claims, 6 Drawing Figures

3,863,176

PORTABLE CHEMICAL LASER

BACKGROUND OF THE INVENTION

This invention relates to a new and improved chemical laser and, more specifically, to a chemical laser which is both self-contained and portable. It has special use as a weapon where portability and ease of operation, particularly with regard to disposal of heat and off-gases, are essential.

The use of individual weapons provided with portable ammunition has been long recognized in the art of warfare. When scaling down these weapons in size, no particular problem is presented. However, in the case of a chemical laser, a size scale-down presents two basic problems. The first problem is associated with obtaining continuous wave action for short periods of time while maintaining a suitable laser output; the second problem is associated with the removal of heat and highly toxic gases from the laser cavity. If not removed or neutralized, both heat and toxic gases could prove extremely harmful to personnel operating a chemical laser. Quite apart from the problem of potential injury, the uncontrolled emission of exhaust gases from a laser cavity may be detected by infrared devices and subject combat personnel to detection and counter measures.

In addition to the necessity of providing a closed system for feeding reactants to the laser cavity and removing exhaust gases therefrom to justify its use as a weapon, a chemical laser should be reasonably portable and provide sufficient power output. Furthermore, a portable weapon requires a portable supply of ammunition; hence, each such round of ammunition must be capable of providing continuous wave action at full power during the entire time reactants are flowing to the laser cavity.

Prior art devices such as disclosed in U.S. Ser. Nos. 286,242, 286,245, and 286,246 disclose combustion chemical lasers and means for chemical and cryogenic removal of effluent gases from the laser cavity. These devices function by combustion to produce continuous wave lasing action and provide a closed system for containing effluent gases from the laser cavity. However, these devices do not provide a portable weapon or a system for disposing of heat without incurring a significant weight gain. Furthermore, reactants employed to feed these devices must be stored in bulky containers which can be very dangerous to personnel if exploded by accident or enemy fire; also they are difficult to transport and store.

It is, therefore, an object of this invention to provide a portable laser which can be readily transported.

Another object is to provide a chemical laser capable of providing short bursts of continuous wave lasing action from portable and disposable cartridge units.

Another object is to provide a chemical laser with a closed system for removing off-gases from the laser cavity.

Another object is to provide a chemical laser provided with means to remove from the weapon a significant portion of the reactant heat produced both in the pump and the cavity.

Another object is to provide a portable chemical laser suitable for field use involving non-lethal purposes. These would include target designation, infrared battlefield surveillance, range finding, jamming and blinding infrared optical devices, optical intelligence purposes, etc.

Another object is to provide a chemical laser adapted to provide continuous wave action for substantially the entire duration of reactant flow from the laser.

Another object is to provide a cartridge for a chemical laser capable of feeding the combustor and cavity with the reactants necessary to produce lasing action.

Another object is to provide a cartridge adapted to remove from the laser both heat and off-gases produced in the laser cavity.

IN THE DRAWINGS

According to the invention, there is provided a chemical laser having a feed cartridge containing separate chambers for each reactant. A burst disc is provided at one end of the feed cartridge and is adapted to be ruptured upon insertion into the device by a suitable means, such as electrical activation, mechanical puncturing, etc. As an example, a fast acting feed valve is provided, which upon activation permits the reactants to be released from the cartridge and combine in the combustion chamber portion of the chemical laser and then be forwarded to the optical cavity of the laser where lasing action takes place. The pump cartridge contains one or more suitable materials which react with and neutralize the exhaust gases and also absorb the heat produced in the lasing cavity and the pump cartridge. The feed cartridge typically contains sufficient reactants to provide about 0.1 to 100 kilojoules of laser energy for a duration of about 0.1 to about 5 seconds.

It has been found that this arrangement not only provides a source of reactants to the laser cavity, but also permits removal of effluent gases from the cavity at sufficient speed to sustain the reaction. Following termination of the reaction, the laser remains under operating vacuum and hence is still available immediately for another shot. Since the entire system is gas tight, there is no source of effluent which could be detected or pose a personnel hazard.

Chemical lasers which may employ the feed cartridge and pump cartridge include these involving a reaction in the combustor between a fuel such as hydrogen, deuterium, $CS_2$, $C_2H_2$, $C_2N_2$, $C_6H_6$, etc., with fluorine, chlorine, bromine or iodine or compounds containing these elements such as $NF_3$, $ClF_3$, solid fluorinated hydrocarbons, etc. This produces a major amount of free halogen such as fluorine. Air, $N_2$, etc. is also employed as a carrier gas. Laser action takes place when the free halogen generated in the combustor enters the cavity and combines with $H_2$ and/or $D_2$ to form halides such as $HF^*$ and/or $DF^*$ molecules in the excited vibrational states.

Decay to lower vibrational levels at supersonic speeds and pressures of 15 torr and below of these $HF^*$ and DF* molecules, produces a lasing action with an output spectrum such as 3.6–4.0 microns for DF and 2.6–2.9 for HF.

The feed cartridge is adapted to supply reactants to both the combustor and the laser cavity and the pump cartridge is adapted to remove exhaust gases from the laser cavity. Both cartridges are preferably matched to permit complete absorption by the pump cartridge of the effluent gases from the laser cavity and much of the heat produced in the cavity and the pump. Ejection of the pump cartridge from the laser after firing removes the heat and the neutralized effluent gases entirely from the system.

Figure 1:
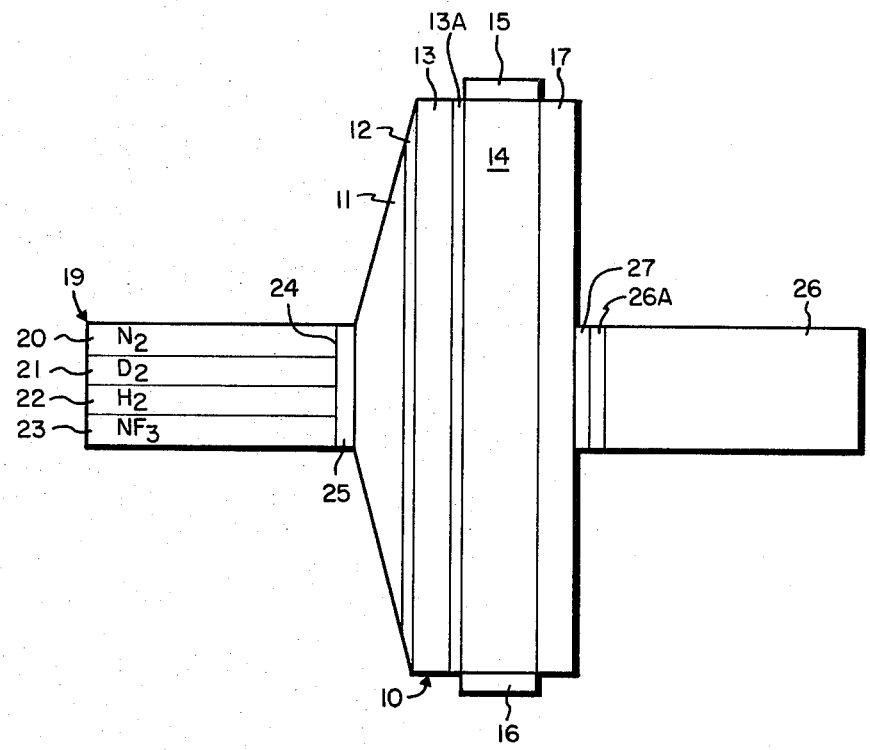
FIG. 1 is a schematic diagram in axial section showing a portable laser with self-contained feed supply and pump cartridges for removing both exhaust gases and heat from the lasing cavity.

FIG. 1 shows, in axial section, a schematic view of a portable chemical laser system which is provided with feed and pump cartridges. The system comprises a laser gun barrel 10 which includes a mixing chamber 11 for premixing gases and a plurality of orifices 12 leading from the mixing chamber to a combustor section 13 where reactant gases such as hydrogen, deuterium, etc., and a halogen such as fluorine are reacted to form principally fluorine atoms. The combustor is provided with plurality of orifices 13a through which the reactant gases including the fluorine atoms are fed into an optical lasing cavity 14. F atoms are combined with $H_2$, $D_2$, or substances containing $H_2$ or $D_2$ to generate HF* and DF* molecules in the cavity 14; decay of these HF* and DF* molecules produces laser radiation. Output mirror 15 and rear mirror 16 are provided at either side of the optical cavity for amplifying and emitting this laser radiation, the output beam being emitted from mirror 15.

Mirrors 15 and 16 can be stable resonator system with output mirror 15 being a partial (e.g., 10–90 percent) reflector. Alternately, mirrors 15 and 16 can be unstable resonators with a scraper mirror positioned therebetween.

A diffuser section 17 is provided to increase the static pressure of the effluent gases leaving the optical cavity and thereby improve the performance of the pump cartridge.

Laser reactants such as $N_2$, $D_2$, $H_2$ and $NF_3$ are contained in a removable feed cartridge 19 comprising individual chambers 20, 21, 22 and 23 respectively, and these reactants are sealed in their individual chambers by individual burst discs 24. The entire feed cartridge is connected to the mixing chamber 11 through a fast acting feed valve 25 adapted to release the reactants upon suitable actuation following rupture of the burst discs.

Similarly, a pump cartridge 26 provided with a burst disc 26a, is mounted at the exit of the diffuser and contains one or more chemical substance for absorbing heat and neutralizing effluent gases from the laser cavity. Exhaust valve 27, upon actuation, permits effluent gases from the laser cavity to react with and be neutralized in the pump cartridge.

Figure 2:
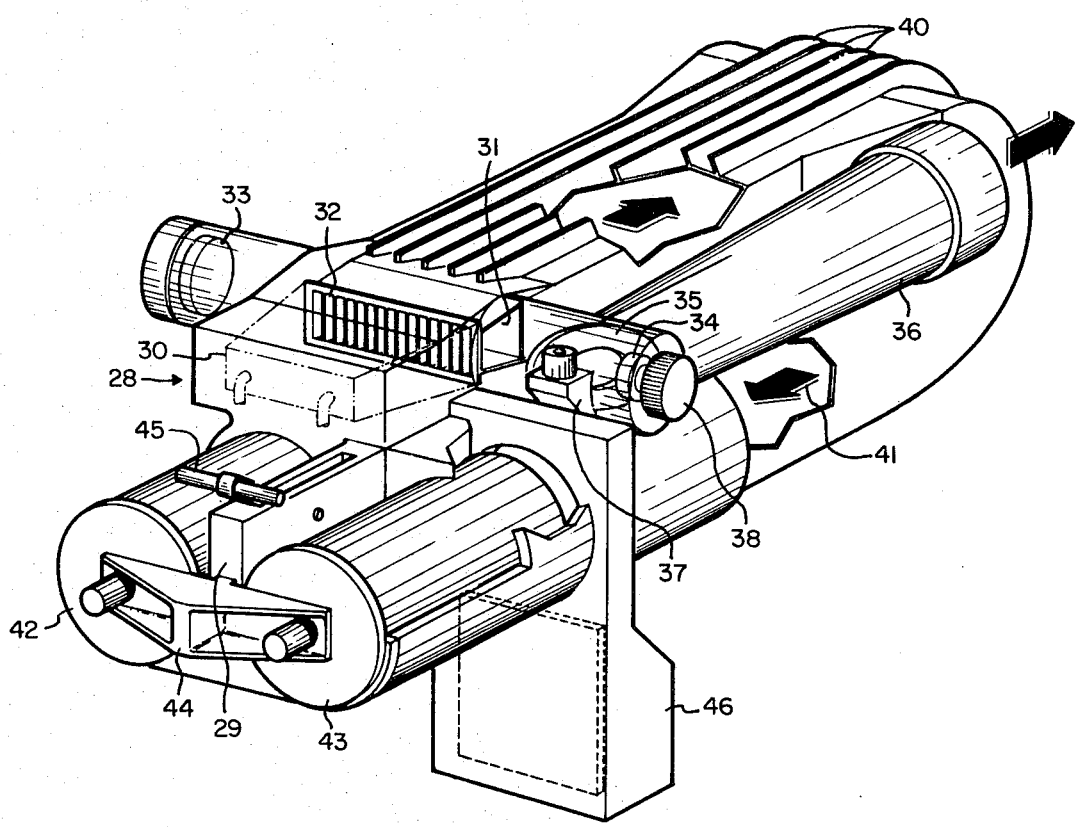
FIG. 2 is a perspective, partially cut-away view, showing basic elements of a cartridge-fed laser according to this invention.

FIG. 2 illustrates, in partially cutaway perspective, a specific embodiment of the chemical laser system illustrated in FIG. 1. The apparatus in FIG. 2 provides a body structure 28 mounting a combustor 30 leading to the laser cavity 31 through a nozzle bank 32. An unstable resonator comprising a concave mirror 33 and convex mirror 34 are adapted to amplify the laser radiation produced in the cavity, and a scraper mirror 35 reflects the radiation through a barrel 36 to a suitable target. A boresite 37 and focus range adjustment 38 permits the user to aim the device. Effluent gases from the laser cavity are passed through a supersonic diffuser section 40 to increase the pressure of the reactant gases which are in the order of supersonic speeds. An exhaust passage 41 is provided for these exhaust gases to travel from the diffuser section and to subsequent neutralization in a pump cartridge. A feed cartridge 42 having burst discs (not shown) and containing reactants and diluent is removably attached to the body 28 and connects to the combustion chamber 30. Rupture of these discs causes rapid expansion of these gases from the feed cartridge into the combustion chamber where they are burned.

A pump cartridge 43 containing suitable materials for absorbing heat and neutralizing effluent gases from the laser cavity is similarly mounted at the exit of the exhaust passage 41. The forward end of the cartridge is provided with a burst disc (not shown). The dead end portion of the feed cartridge 42 and pump cartridge 43 are secured by a holder 44 releasably mounted in a breach block 29. A release bar 45 is provided to eject the feed cartridge and pump cartridge upon completion of firing. A spring loaded check valve in the breach block (not shown) is provided to permit entry of gases from the feed cartridge to the lasers; a guillotine valve 46 is provided to simultaneously open the pump cartridge to exhaust gases.

If desired, the burst discs may be ruptured electrically or mechanically.

Figure 3:
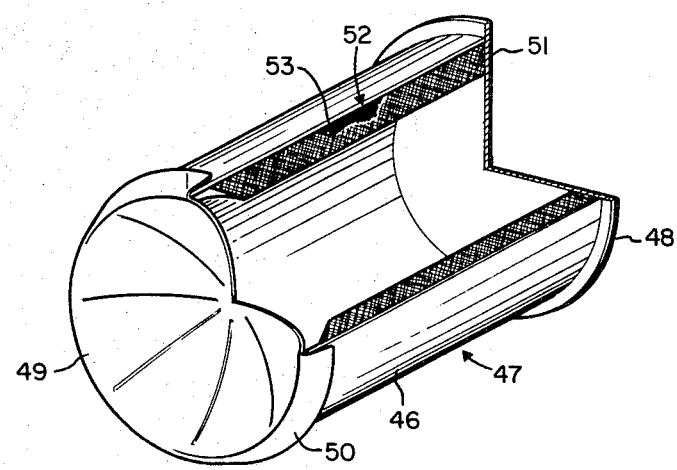
FIG. 3 is a perspective, partially cut-away view, showing a chemical pump cartridge according to this invention.

FIG. 3 illustrates, in cutaway perspective, one embodiment of a pump cartridge adapted to remove effluent materials and heat from both pump and the laser cavity. The cartridge comprises a cylindrical metal body 47, one end of which defines a flat flange closure 48 to permit extraction of a cartridge from its loaded position in the laser. A burst disc 49 is provided at the other end of the cartridge and comprises a prescored hemispherical metal dome of thin gauge metal. A lip seal 50 is provided to be seated into the laser and produce a vacuum seal. Positioned inside the cartridge is an annular metal screen 50 apart from the cylindrical side wall 47 to form a space 52 therebetween. This space is filled with a bed of material such as calcium metal 53 suitable for reaction with and neutralization of the laser effluent. Since the calcium may not pump the laser effluent at sufficiently high rates at normal ambient temperatures, provisions may be made to preheat the calcium to approximately 400°C prior to firing the laser. This can be accomplished by electrical preheating. Another method of raising the temperature of the calcium metal employs a pyrotechnic charge similar to thermite and is configured within the cartridge to rapidly supply heat to the calcium bed upon activation. Another method of preheating the calcium metal is to coat the calcium with a thin layer of sodium or potassium when the cartridge is manufactured. Effluent gases will react rapidly with the potassium upon exposure to generate calcium bed temperatures which are high enough to neutralize the gases at the rate required to maintain adequate cavity pressures. Still another way to heat the calcium is to admit a small quantity of oxygen just before the bulk of the effluent gas. Oxygen reacts with calcium and raises its temperature even if the calcium bed was originally at room temperature.

Preferably, the calcium metal is coated on common salt (NaCl) or similar material to provide a combination of effluent removal and heat removal. Effluent removal is accomplished by reaction of DF, HF, $N_2$, and $D_2$ with the calcium metal to form the respective fluoride, hydride, nitride, and deuteride compounds. Removal of heat from the system occurs first by fusion of the NaCl due to the heat from lasing action in the cavity and the pumping reaction. Optimum fusion temperatures range from about 450°C to the melting point of NaCl which is about 804°C. Then, upon ejection from the system, the spent pump cartridge 43, containing both absorbed heat and neutralized effluents, is thereby removed from the laser. While calcium and NaCl have been described as the materials preferably employed as the effluent gas and heat removal substances, other equivalent materials may be employed. Titanium is another example of a material which may be employed as the chemical pump reactant although its operation occurs most effectively in the 500° to 900 °C range. Other materials, such as aluminum, calcium chloride, lithium chloride, lithium hydride, potassium bromide, sodium bromide, etc., may be employed to absorb the excess heat by fusion.

A nominal 10 kilojoule reaction for a one second duration pulse requires a chemical pump cartridge containing approximately 400 grams of calcium coated onto about 2,688 grams of NaCl and should operate within the temperature range of about 400°–804°C. This will neutralize a baseline laser effluent flow of 100 grams as shown below in Table I.

TABLE I

BASELINE LASER EFFLUENT FLOW

| Compound | Mols/Sec | Gm/Sec |
|---|---|---|
| DF | 0.572 | 12.01 |
| HF | 1.210 | 24.20 |
| $N_2$ | 1.925 | 53.90 |
| $D_2$ | 2.474 | 9.89 |
|  | Total Flow | 100.00 gm/sec |

The compounds formed from the baseline flow and the total heat released produced therefrom is shown below in Table II. These compounds represent the stoichiometric values assuming the reaction goes to completion. Experimental values establish that the compounds do not have the precise values as indicated.

TABLE II

COMPOUNDS FORMED AND HEAT RELEASED IN CHEMICAL PUMPING WITH CALCIUM

| Compound | Mols/Sec | Cal/Mol | Cal/Sec |
|---|---|---|---|
| $CaH_2$ | 0.605 | 45,100 | 27,285 |
| $Ca_3N_2$ | 1.925 | 105,000 | 202,125 |
| $CaD_2$ | 2.76 | 45,100 | 124,476 |
| $CaF_2$ | 0.891 | 290,000 | 258,390 |
|  |  | Total Heat Release | 612.276 Cal/Sec |

Figure 4A:
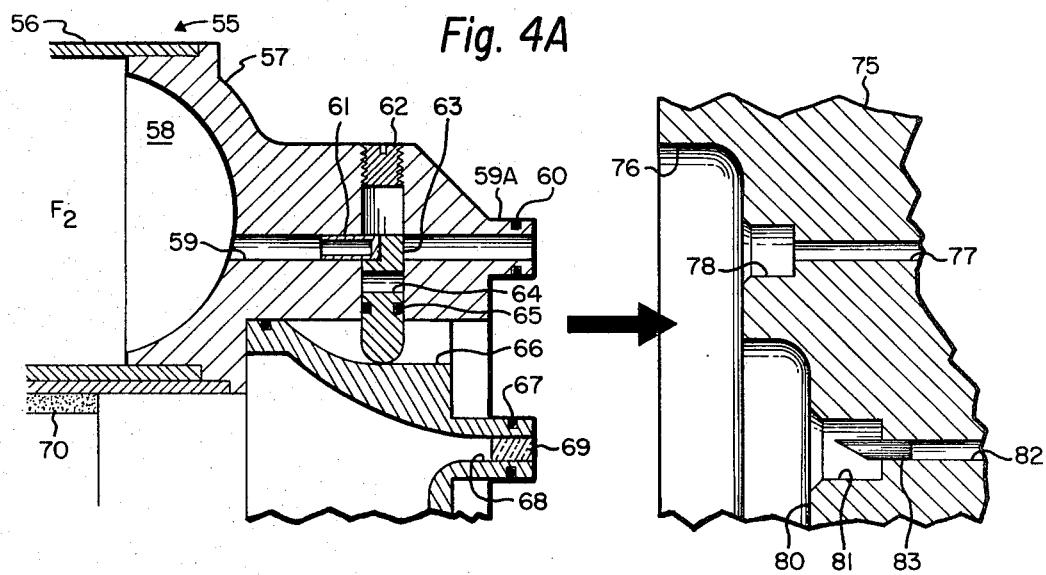
FIGS. 4a–c are sectional side elevation views showing an embodiment of a feed cartridge suitable for use in a chemical laser.
Figure 4B:
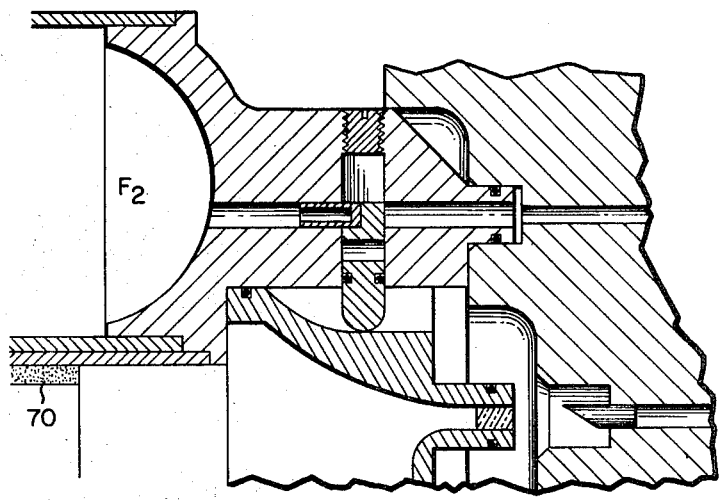
Figure 4C:
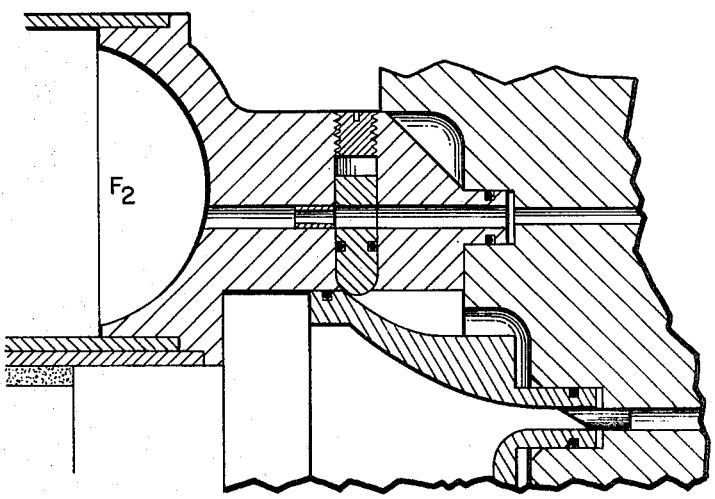

FIGS. 4a–c illustrate one embodiment of a feed cartridge suitable for use in a chemical laser and shows, in sequence, the cartridge assembly prior to and during insertion into the breach of the laser.

FIG. 4a shows a portion of a feed cartridge 55 prior to insertion into the breach body. The cartridge comprises an elongate metal casing 56, having a thick forged metal head 57 fitted therein. A laser reactant 58 such as fluorine is stored under pressure within the casing 56 and head 57. A gas passage 59 defining a tubular end 59a is provided within the head for escape of the gas into the laser upon firing; an O-ring seal 60 is provided at the end of the passage to maintain a gas tight fitting. A frangible hollow plug 61 seals the gas passage 59. A recessed slot 62 is provided within head 57 and a movable cutter pin 63 is positioned within the slot and in contact with the plug 61. The cutter pin defines an orifice 64 which aligns with gas passage 59 when the cutter pin is fully raised into the slot 62.

An O-ring seal 65 is mounted around the cutter pin and prevents fluorine gas from escaping around the pin rather than along the passageway 59.

An arcuate-shaped piston 66 is slidably mounted on the cartridge. The forward end of the piston provides a tubular extension 67 defining a gas passage 68 sealed by a plug 69; an O-ring seal is provided around the extension 67. A pyrotechnic device 70 is provided to pressure the piston forward upon ignition. As shown in FIGS. 4a and b, the laser provides a breach body 75 within which the cartridge 55 is inserted. The breach defines a primary cavity 76 which mates with the forward end of the cartridge upon insertion. A gas passage bore 77 is provided for reactant to escape into the laser cavity or the combustion chamber. A seat 78 at the entrance of the passage provides a close seal fit with the tubular end 59a. The breach body 75 also defines a secondary cavity 80 which mates with the piston 66 when it is moved forward. A seat 81 is provided in cavity 80 within which tubular extension 67 fits upon forward motion of piston 67. A gas vent passage 82 connects from the seat 81 to permit escape of gases following activation of the pyrotechnic. A cutter tube 83 is mounted within the passage 82 and seat 81 for rupturing the gas seal 69. It will be appreciated that the complete cartridge will also contain similar components for the other gases such as $N_2$ and $N_2$ for the combustion chamber and the cavity. Similar passages for these gases are also provided.

In FIG. 4c, the pyrotechnic is ignited. Initially, a gas pressure buildup occurs thereby forwardly actuating the piston 66; this contacts and raises the cutter pin 63 until it shears off the end of seal plug 61 and brings orifice 64 into coincidence with passage 59. This permits the fluorine to escape into the combustion chamber. At the end of the piston stroke, the cutter tube ruptures plug 69 and permits the pyrotechnic gas to vent. Following lasing action, the cartridge and cavity section are at low vacuum since the effluent gases have been removed by the pump cartridge. A spring loaded check valve (not shown) is provided in the breach which permits entry of gases into the laser when plug 61 is ruptured. Upon completion of firing, the check valve closes thereby permitting the cartridge to be removed without breaking the cavity vacuum.

As previously noted, the guillotine valve functions to expose the pump cartridge to effluent gases upon actuation and seal off the pump cartridge from the cavity upon completion of firing.

It will be quite obvious that the chemical laser described herein is adapted to provide a continuous wave chemical laser operation for a reasonably suitable time span (such as one second) and high power without the attendant problems of cumbersome equipment, the escape and detection of dangerous laser effluent gases, and excessive heat buildup. Furthermore, since the reactants are contained in relatively small modules, they may be transported and handled; also they do not expose a large target which is prone to destruction by hostile events or accidental causes. The portability of the feed and pump cartridges and also the device itself permit use by individual troops in the field. Larger devices may be moved effectively by truck, ship or aircraft thus providing enhanced flexibility to military operations involving high energy lasers. We claim:

1. A chemical laser comprising:
   a combustion chamber;
   a laser gain region;
   an effluent section;
   a removable feed cartridge for separately supplying reactants and diluent to the combustion chamber and laser gain region for creating a laser medium with a population inversion therein;
   a removable pump cartridge for absorbing heat and neutralizing effluent gases from the laser gain region at sufficient speed to sustain a CW lasing reaction;
   means for sealing the feed and pump cartridges to the combustion chamber and effluent sections respectively during operation of the laser; and
   means to seal the combustion chamber and effluent sections upon termination of the lasing action and removal of the feed and pump cartridges from the laser to thereby maintain operating pressures within the laser.

2. The chemical laser of claim 1 in which the effluent section comprises a diffuser and an exhaust passage.

3. The chemical laser of claim 1 which includes a mixing chamber connected to the combustion chamber.

4. The chemical laser of claim 1 in which a major amount of free halide is generated in the combustion chamber.

5. The chemical laser of claim 1 in which one of the reactants is selected from the class consisting of: $H_2$, $D_2$, $CS_2$, $C_2N_2$, $C_2H_2$ and $C_6H_6$, and the other reactant is selected from a compound capable of forming free halogen.

6. The chemical laser of claim 5 in which the free halogen is atomic fluorine.

7. A process for operating a chemical laser comprising:
   feeding reactants to the laser from a removable, gas-tight feed cartridge to produce a CW lasing reaction;
   collecting and neutralizing effluent gases and heat from the laser with a removable, gas-tight pump cartridge at a speed sufficient to sustain the reaction; and
   maintaining an operating pressure within the laser upon termination of the reaction following removal of the feed and pump cartridges.

8. The process of claim 7 in which the chemical laser includes a combustion chamber and the reactants are fed and burned in said chamber.

9. The process of claim 7 in which the reactants are premixed prior to being fed to the combustion chamber.

10. The process of claim 7 in which one of the reactants is selected from the class consisting: $H_2$, $D_2$, $CS_2$, $C_2N_2$, $C_6H_6$ and $C_2H_2$, and the other reactant is selected from a compound capable of forming free halogen.

11. The process of claim 10 in which the free halogen is atomic fluorine.

* * * * *

UNITED STATES PATENT OFFICE
CERTIFICATE OF CORRECTION

Patent No. 3,863,176    Dated January 28, 1975

Inventor(s) John S. Martinez, John R. Ogren & Eugene V. Rutkowski

It is certified that error appears in the above-identified patent and that said Letters Patent are hereby corrected as shown below:

In Column 6, Line 36, after "and", $N_2$ should read --$H_2$--

Signed and sealed this 29th day of April 1975.

(SEAL)
Attest:

RUTH C. MASON
Attesting Officer

C. MARSHALL DANN
Commissioner of Patents
and Trademarks